United States Patent [19]

Kratz et al.

[11] Patent Number: 4,685,939
[45] Date of Patent: Aug. 11, 1987

[54] PRODUCTION OF OXYGEN ENRICHED AIR

[75] Inventors: Wilbur C. Kratz, Macungie; Shivaji Sircar, Wescosville, both of Pa.

[73] Assignee: Air Products and Chemicals, Inc., Allentown, Pa.

[21] Appl. No.: 713,503

[22] Filed: Mar. 19, 1985

[51] Int. Cl.$^4$ ............................................. B01D 53/04
[52] U.S. Cl. ........................................ 55/25; 55/62; 55/68; 55/75
[58] Field of Search ................... 55/25, 26, 31, 33, 35, 55/58, 62, 68, 75, 179, 389

[56] References Cited

U.S. PATENT DOCUMENTS

| | | | |
|---|---|---|---|
| 2,944,627 | 7/1960 | Skarstrom | 55/58 X |
| 3,140,931 | 7/1964 | McRobbie | 55/25 |
| 3,142,547 | 7/1964 | Marsh et al. | 55/26 |
| 3,155,468 | 11/1964 | Montgareuil | 55/25 |
| 3,164,454 | 1/1965 | Wilson | 55/68 |
| 3,176,444 | 4/1965 | Kiyonaga | 55/26 |
| 3,237,377 | 3/1966 | Skarstrom | 55/58 X |
| 3,242,645 | 3/1966 | Montgareuil et al. | 55/58 |
| 3,313,091 | 4/1967 | Berlin | 55/58 |
| 3,636,679 | 1/1972 | Batta | 55/26 |
| 3,638,398 | 2/1972 | Domine et al. | 55/25 |
| 3,717,974 | 2/1973 | Batta | 55/58 |
| 3,738,087 | 6/1973 | McCombs | 55/58 |
| 3,796,022 | 3/1974 | Synonet et al. | 55/25 |
| 3,923,477 | 12/1975 | Armond et al. | 55/58 X |
| 3,957,463 | 5/1976 | Drissel et al. | 55/58 X |
| 4,013,429 | 3/1977 | Sircar et al. | 55/33 |
| 4,070,164 | 1/1978 | Miwa et al. | 55/26 |
| 4,129,424 | 12/1978 | Armond | 55/25 |
| 4,168,149 | 9/1979 | Armond et al. | 55/21 |
| 4,194,891 | 3/1980 | Earls et al. | 55/26 |
| 4,194,892 | 3/1980 | Jones et al. | 55/68 X |
| 4,222,750 | 9/1980 | Gauthier et al. | 55/58 |
| 4,264,339 | 4/1981 | Juntgen et al. | 55/25 |
| 4,359,328 | 11/1982 | Wilson | 55/68 X |
| 4,512,780 | 4/1985 | Fuderer | 55/68 X |

Primary Examiner—Robert Spitzer
Attorney, Agent, or Firm—Carol A. Nemetz; James C. Simmons; E. Eugene Innis

[57] ABSTRACT

A pressure swing adsorption process is provided for the direct production from ambient air of a moderately enriched oxygen product gas. The production of a product gas having an oxygen concentration of 23 to 30% is effected by a three step cycle wherein (1) the feed air is charged to a bed of nitrogen selective adsorbent until the bed is brought from atmospheric pressure to a pressure in the range of up to 10 atmospheres, (2) reducing the bed pressure to an intermediate level by withdrawal of oxygen enriched product gas therefrom and (3) finally venting the bed to restore atmospheric pressure. By an alternative mode including a fourth step of purging the bed following the venting step, a product of 23 to 45% oxygen concentration is obtained.

11 Claims, 4 Drawing Figures

4,685,939

PRODUCTION OF OXYGEN ENRICHED AIR

BACKGROUND OF THE INVENTION

The present invention relates to separation of gases by selective adsorption and is particularly concerned with the recovery from ambient air of an industrially useful gas product of enriched oxygen content.

PRIOR ART

In U.S. Pat. No. 4,013,429, there is a discussion of various systems disclosed in prior patent literature for fractionation of air by selective adsorption. In general, these prior art processes usually employ a column containing a bed of adsorbent selective for retention of nitrogen, through which bed the feed air is passed, with the discharge therefrom of a primary effluent highly enriched in oxygen. Regeneration of the nitrogen-loaded bed is carried out by pressure reduction and/or purging the bed with a gas stream. The aim of these prior art processes is to obtain a product stream of high oxygen content, greater than about 80% $O_2$, and the steps of the process and operating conditions are designed to attain this end. The oxygen recovery (defined as oxygen actually recovered as enriched air as a percentage of total oxygen in the air feed) for such high enrichment processes have been in the order of about 40%. Operation of a high-enrichment process in a way so as to obtain a product of lower oxygen content leads to even lower recovery efficiency.

As examples of such prior art process employing an initial high pressure in the adsorption step and a pressure near atmospheric during nitrogen desorption (PSA), reference is made to U.S. Pat. Nos. 2,944,627 and 3,717,974.

In other described prior art processes, desorption of nitrogen from the bed is carried out at subatmospheric pressure (VSA), as exemplified by U.S. Pat. Nos. 3,796,022; 4,013,429; 4,129,424 and 4,168,149.

The favored adsorbents for selective retention of nitrogen are commercially available synthetic zeolites such as type A, type X and mordenites. In most of the prior art processes, provision is made for removal of water and $CO_2$ from the feed air before its introduction into the nitrogen sorption bed.

While there are a number of applications where highly oxygen-enriched air is required or desired, there are also certain industrial processes in which enriched air of lower oxygen concentration can be and is employed. Thus, in combustion processes of various kinds and in chemical and biolchemical reactors, air containing in the range of about 23 to 45% $O_2$ is utilized. Such moderately oxygen-enriched air is obtained by the addition of relatively pure oxygen in liquid or gaseous state to an ambient air stream. While such approach is technically satisfactory, it is relatively costly and may be economically undesirable in certain applications which would otherwise benefit from the use of such moderately oxygen-enriched air products. A Among the objects of the present invention is to provide a simple and economical process for production from ambient air of a useful oxygen-enriched product gas of controlled moderate oxygen concentration, at high oxygen recovery efficiency.

SUMMARY OF THE INVENTION

In accordance with the invention, there is produced from ambient air by selective adsorption techniques an oxygen-enriched gas product having an oxygen content of 23 to 50 volume percent. In practice of the invention, a largely simplified adiabatic pressure swing adsorption cycle (PSA) is employed. The process is operated by admitting the feed air into a column, preferably at one end thereof, containing a bed of nitrogen-selective adsorbent until the column is brought from atmospheric pressure to a first pressure of several atmospheres. The column pressure is then reduced to an intermediate second pressure level, by removing oxygen enriched air as product from the column in a flow direction concurrent with that of the initial introduction of feed air into the bed, such as at the opposite end of the column from feed air introduction. Then the column pressure is further reduced to atmospheric by venting in a flow direction counter to that of withdrawal of oxygen enriched product, such as by venting through the initial air inlet end, thus completing the cycle and preparing the column for repetition of the cycle sequence. By such modest operation, there is obtained an oxygen-enriched product gas of 23–26% oxygen content, with recovery of about 75 to 85% of the oxygen from the feed air.

An oxygen-enriched product gas of higher oxygen content as that containing up to 50% oxygen is obtained by including an added step in the cycle sequence. Following the venting of the column, the bed is purged with part of the oxygen enriched air product in a flow direction countercurrent to the feed air introduction and the cycle is repeated, thereby providing an oxygen enriched product from subsequent cycles containing up to about 50% oxygen. Alternatively, it has been found advantageous in certain instances to operate the process of the invention under conditions such as to obtain from ambient air an enriched effluent having up to about 30 to 50% oxygen, which can then be simply diluted with ambient air to obtain a mixed product gas of lower oxygen content as in the desired range of 23 to 35% $O_2$.

In the conduct of the process of this method the first pressure can be in the range from super atmospheric up to about 10 atmospheres. Generally, this first pressure is maintained at a level of at least about 1.5 atmospheres. While the upper limit of this first pressure can be as high as about 10 atmospheres, it is preferable that pressures somewhat lower than 10 atmospheres be employed. Thus, for example, it is preferable to limit the upper level of the first pressure to no more than about 7 atmospheres, with pressures limited to 5 atmospheres and even as low as 4 atmospheres having been found to be quite satisfactory. It will be understood, of course, that certaain efficiencies in operation can be effected by the utilization of lower pressures.

In connection with the removal of oxygen-enriched air as product, it is an essential part of this invention that the second pressure be at a level no greater than 0.75 times the first pressure. Preferably, the second pressure can be less than 0.7 times the first pressure, with satisfactory results having been achieved when utilizing second pressures which are only 0.67 or even 0.60 times the first pressure. It will also be understood, of course, that whatever pressure level is selected for the second pressure, it must be greater than atmospheric pressure.

In the operation of this invention, it must be noted that the step of venting to atmospheric pressure occurs immediately following the depressuring to a second pressure level and recovery of product. There is no intermediate purging of the bed or reduction to subatmospheric pressure intermediate the two steps recited.

Additionally, the initial pressuring of the adsorbent bed to the first pressure level is effected solely by the introduction of ambient air to the bed. There is no supplemental pressuring of the bed by the introduction of an additional gas.

DETAILED DESCRIPTION

Figure 1:
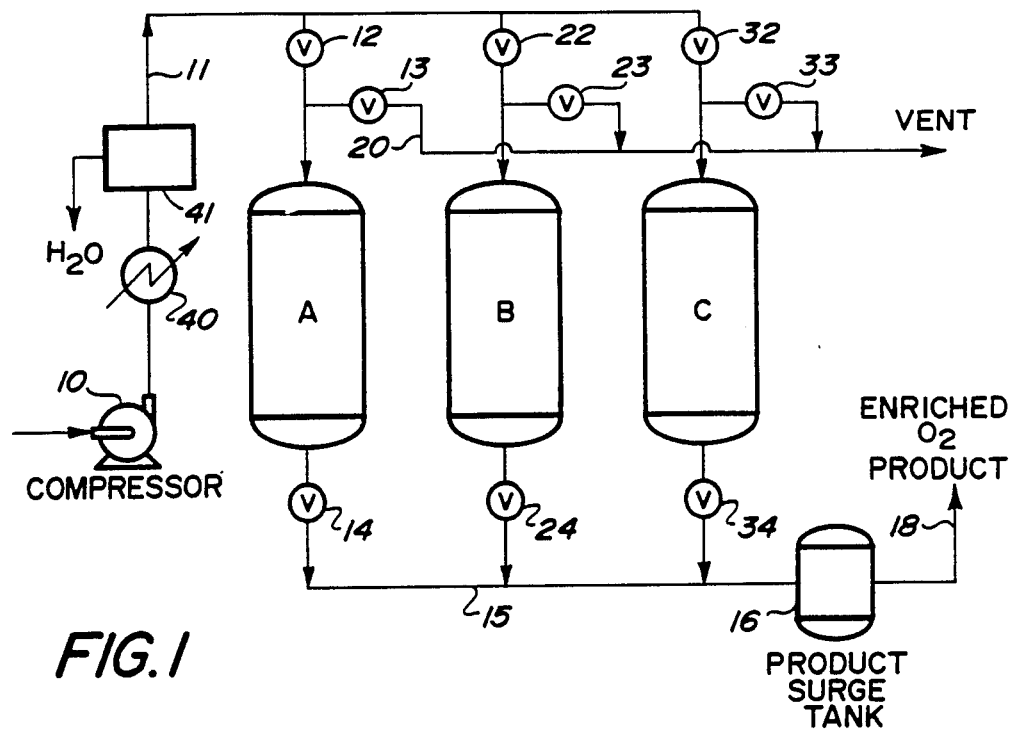
FIG. 1 is a diagrammatic flow sheet of a system suitable for practice of the invention for the production from ambient air of a gas product having an oxygen content of 23 to 30%.

While not limited thereto, the illustrated embodiment in FIG. 1 shows three adsorbent columns designated A, B and C operated in parallel. The feed air is compressed at 10, cooled to near ambient temperature in water cooler 40, passed through a knockout drum 41 for removal of condensed water and is passed via line 11 into a selected one of the columns then on stream. Each of the columns is packed with two layers of adsorbent. The layer at the feed end will remove water and at least part of the carbon dioxide from the feed air. Any of the known adsorbents generally used for this purpose may be employed, such as type A or type X molecular sieve zeolite, alumina, silica gel and activated carbon. For the contiguous second layer, there may be employed any of the known adsorbents selective for retention of nitrogen, such as synthetic mordenite, or type A or type X molecular sieve zeolite, which may be exchanged with various cations.

Assuming that Column A is to receive the influent air feed, Column A will be initially at atmospheric pressure. With valve 12 open and valves 13 and 14 closed, introduction of compressed air into Column A will be continued as a first step until a first designed, superatmospheric pressure level is reached in the column, which pressure level can be up to about 10 atmospheres, preferably in the range of 1.5 to 4 atmospheres. In the next step of the cycle sequence, valve 12 is closed and valve 14 opened, whereby a primary effluent enriched in oxygen is withdrawn from Column A and passed via line 15 into a collection vessel 16 serving as a product surge tank from which tank the enriched product gas may be withdrawn for desired use via line 18. Withdrawal of product from Column A is continued until the pressure therein is reduced to a second preset, intermediate level above atmospheric.

When the designed intermediate pressure level is attained, valve 14 is closed and valve 13 is opened, whereby Column A is vented to atmospheric pressure, the residual gas being desorbed and discharged via line 20. Column A is then ready for repetition of the sequence of operations with readmission of ambient air thereto.

The process steps for Columns B and C, in turn, follow the identical sequence as described for Column A in offset relation. The positions of the valves associated with the particular columns of a 3 column system are shown in Table 1 based on a 90-second operating cycle, in which feed gas is continuously introduced to and enriched gas continuously withdrawn from the system.

TABLE 1

| Time | Columns | | | Valves | | | | | | | |
|---|---|---|---|---|---|---|---|---|---|---|---|
| Sec. | A | B | C | 12 | 13 | 14 | 22 | 23 | 24 | 32 | 33 | 34 |
| 0-30 | Ad | D2 | D1 | O | C | C | C | O | C | C | C | O |
| 30-60 | D1 | Ad | D2 | C | C | O | O | C | C | C | O | C |
| 60-90 | D2 | D1 | Ad | C | O | C | C | C | O | O | C | C |

C = Close
O = Open
Ad = Adsorption
D1 = First depressurization
D2 = Second depressurization While Table 1 shows a 90-second three-step cycle, it will be understood that longer or shorter operating cycles may be employed as from about 30 to 720 seconds equally timed for (1) nitrogen adsorption, (2) depressurizing to intermediate pressure level and (3) venting to atmospheric pressure.

The described 3-step cycle can be employed for enriching ambient air to an oxygen content of 23 to 30%. Although the process is described for a three column system, by proper sizing of the surge vessel, it can be carried out with only one or two columns.

Figure 2:
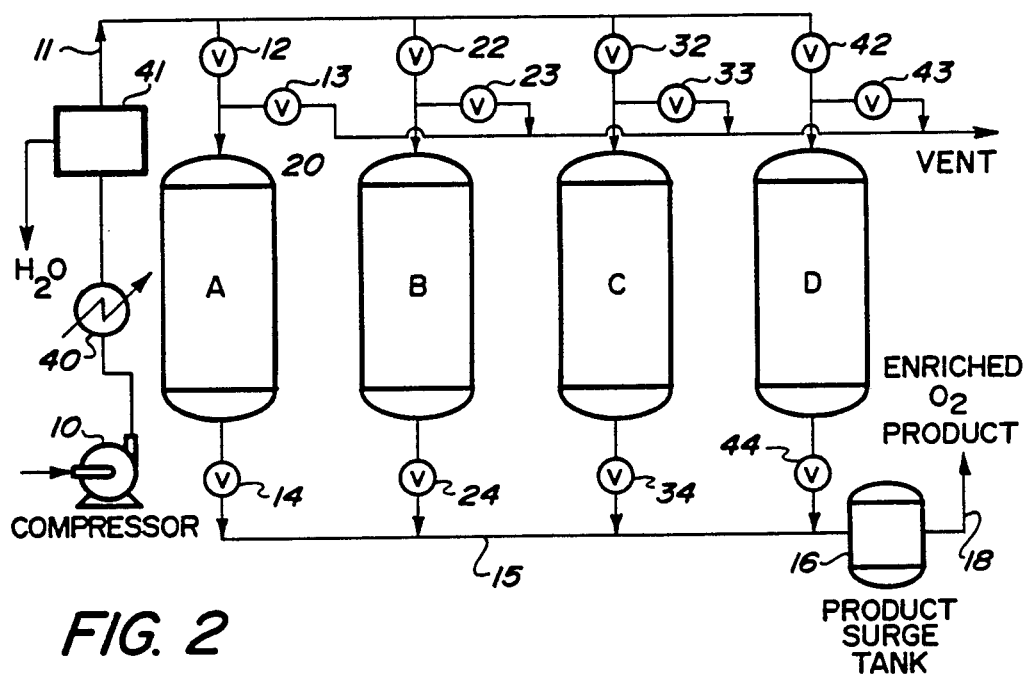
FIG. 2 is a diagrammatic flow sheet of a system for practice of the invention for the production from ambient air of a gas product having an oxygen content of over 23 to 50%.

The embodiment shown in FIG. 2 can be employed for the production of an enriched product gas having an oxygen content of over 23 to 50%. For this purpose, an additional step is employed in the cycle wherein the on-stream column is purged following the venting step. The adsorbent packing in each of the columns is the same as that previously described.

The four columns in the FIG. 2 embodiment are labeled A through D. As before, referring to Column A, that column is initially at atmospheric pressure. The pressure in the column is increased to the designed superatmospheric level (1.5 to 4 atmospheres) by introducing compressed feed air at near ambient temperature, after removal of condensed water, through open valve 12, with valves 13 and 14 being closed. Then the pressure is reduced to an intermediate level above atmospheric, by withdrawing product enriched air through opened valve 14, with valves 12 and 13 being closed. The enriched product gas passes into tank 16 or from another column producing it via line 15. In the third step of the cycle the pressure in Column A is reduced to atmospheric by venting residual gas from the bed through valve 13, with valves 12 and 14 closed. Following the venting, as a final step in the cycle, Column A is purged with enriched air withdrawn from the product surge tank 16, or from another column producing it via line 15 and passed through column A countercurrent to the direction of feed air introduction by way of open valves 14 and 13 to vent.

The purge step desorbs more $N_2$ from the column and sharpens the adsorption mass transfer zone and produces a product gas of higher oxygen content in the following adsorption step of the next repeated cycle. The process sequence for columns B, C and D is the same but the steps are offset so that the product production step and the air feed step are continuous throughout the cycle. The valve sequences for the four bed system are shown in Table 2. Here again, the process could be carried out with one to three columns by utilizing a product surge vessel of appropriate size.

TABLE 2

| Time Sec. | Columns | | | | Valves | | | | | | | | | | |
|---|---|---|---|---|---|---|---|---|---|---|---|---|---|---|---|
| | A | B | C | D | 12 | 13 | 14 | 22 | 23 | 24 | 32 | 33 | 34 | 42 | 43 | 44 |
| 0–30 | Ad | P | D2 | D1 | O | C | C | C | O | O | C | C | C | C | C | O |
| 30–60 | D1 | Ad | P | D2 | C | C | O | O | C | C | C | O | O | C | O | C |
| 60–90 | D2 | D1 | Ad | P | C | O | C | C | C | O | O | C | C | C | O | O |
| 90–120 | P | D2 | D1 | Ad | C | O | O | C | O | C | C | C | O | O | C | C |

C = Close
O = Open
Ad = Adsorption
D1 = First depressurization
D2 = Second depressurization
P = Purge In the four step cycle as well as in the three step cycle the temperature range for the process can be 10° to 60° C. Also the four-step cycle may be carried out in a shorter or longer time period than 120 seconds as in the range of 40 to 960 seconds, with equal time for each of the four steps.

EXAMPLE 1

In an experimental run operated in the three-step mode, each of the adsorbent beds employed was 4 inches (10.16 cm) in diameter and 16 ft. (4.88 meters) long. The layer of adsorbent for $CO_2$ and water removal in each bed was 14 pounds (6.35 kg.) of type X molecular sieve and that of the nitrogen retaining layer was 42 pounds (19 kg.) of the same zeolite. The column was initially brought from atmospheric pressure to 3 atmospheres by admitting 7.3 SCF (207 liters) of ambient air. The column pressure was then reduced from 3 atmospheres to 1.7 atmospheres by withdrawal of 5.1 SCF (144 liters) of enriched air, which had an oxygen content of 25 volume percent. Finally, the column pressure was reduced to atmospheric by venting and the cycle repeated. 83% of the oxygen content of the feed air was recovered in the enriched gas product.

EXAMPLE 2

In an experimental run employing the four step mode of operation, the bed size and adsorbent layers were the same as in the foregoing example. In the initial adsorption step the column pressure was increased from atmospheric to 3 atmospheres by introduction of 7.3 SCF (207 liters) of air feed. Then the pressure was reduced to 2 atmospheres by withdrawal of enriched product gas; following which the column was vented to a pressure of one atmosphere. Finally, the beds of adsorbent were purged with enriched gas product withdrawn from the surge vessel. The enriched product rate obtained was 4.0 SCF (113.0 liters) per bed and the enriched air purity was 28.0% oxygen. The oxygen recovery from the feed air in the enriched product gas was 73%.

It has been found that in certain combustion processes higher flame temperatures are required than that which can be obtained with ambient air. Such higher flame temperatures have been attained with modest increases in the oxygen content of the air employed. For these and other processes employing oxygen-containing gas, combustion efficiency can be more than doubled by enriching the air utilized from the normal 21% oxygen to levels in the order of 25 to 35% oxygen. Heretofore, such oxygen enriched gas was obtained by the addition of pure oxygen. The admixture of pure oxygen is relatively expensive and is regarded by some potential users as hazardous. The present invention provides a simple and economically attractive route for directly obtaining from ambient air moderately enriched gas for industrial use, containing up to 45% $O_2$. In addition to use of such enriched gas in the usual combustion processes, these may be beneficially employed in various oxidation processes used in chemical and biochemical reactors.

While an oxygen enriched product of 23–26% $O_2$ can be obtained directly from ambient air by operation of the three step process sequence of FIG. 1 and Table 1, it has been found more efficient economically to employ the process sequence of FIG. 2 and Table 2 to produce an oxygen enriched product effluent of over 26% $O_2$ and up to about 30–45% $O_2$ and to dilute the obtained effluent product with atmospheric air to provide an oxygen-enriched product of desired oxygen concentration in the 23–26% range.

EXAMPLE 3

Figure 3:
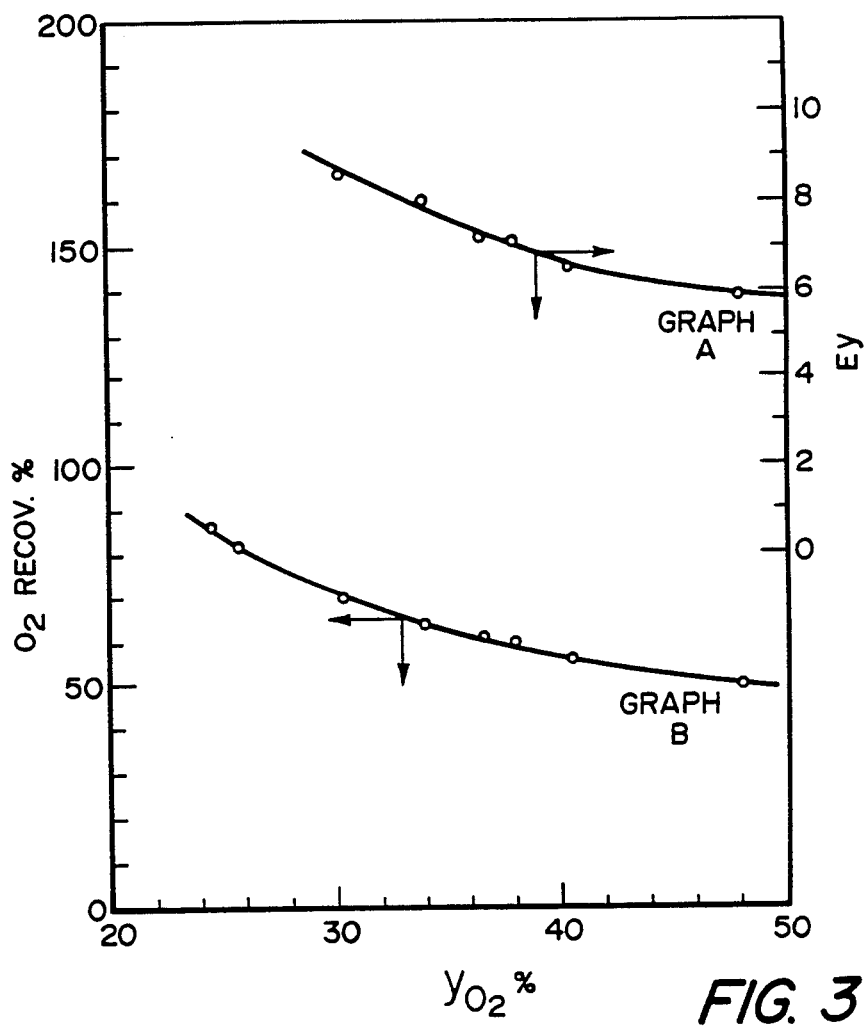
FIG. 3 is a series of graphs showing (a) the weight amount of oxygen produced from the feed air per unit amount of adsorbent at various levels of oxygen purity and (b) the oxygen recovery from feed air at these $O_2$ purity levels.

A number of individual runs were made, as shown in FIG. 3 under conditions to produce oxygen-enriched products in accordance with the invention, having progressively increased oxygen concentration from about 25% to 48% and the percent of oxygen recovered plotted at each concentration as shown in Graph B of FIG. 3. These operations were carried out at 21° C. and at an attained on-stream pressure of 40 psig, using a $CO_2$-free dry air feed. The pressure let-down level was adjusted and the purge time was increased from run to run to obtain increased oxygen enrichment.

Graph A of FIG. 3 records the amount of zeolite adsorbent utilized in terms of pound moles of contained oxygen produced per hundred thousand pounds of the adsorbent in the bed.

Figure 4:
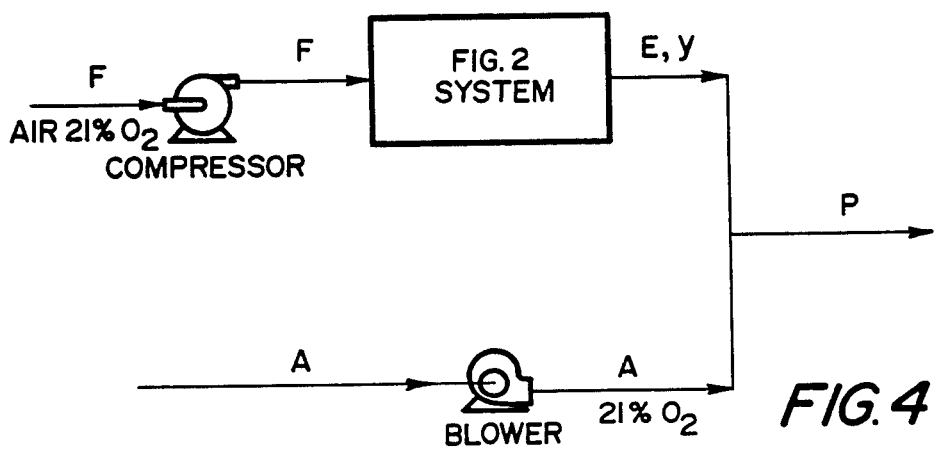
FIG. 4 is a diagrammatic flow chart of an alternative embodiment of the invention.

The mixing of ambient air with the oxygen enriched effluent from the adsorption process is diagrammatically illustrated in FIG. 4. Ambient air F is compressed to a desired pressure of several atmospheres and charged to a selective adsorption system such as illustrated in FIG. 2, obtaining an oxygen enriched product E having an oxygen concentration of over 26%. The desorbed waste gas W and purge gas are vented from the column. To obtain a final product P of desired oxygen concentration ambient air A (containing 21% oxygen) is admixed in suitable amount to provide the desired oxygen concentration.

TABLE 3

MATERIAL AND ENERGY BALANCE ACCORDING TO FIG. 4 TO PRODUCE 25% OXYGEN AIR

| y, % $O_2$ | R ($O_2$ Recovery) in Oxy-rich | A/P | F/P | E/P | KWH lb mole of P | lbs Adsorbent per bed/P |
|---|---|---|---|---|---|---|
| 0.25 | 0.84 | 0 | 1.42 | 1.0 | 0.52 | 2332 |
| 0.30 | 0.71 | 0.56 | 0.89 | 0.44 | 0.44 | 1511 |
| 0.40 | 0.56 | 0.79 | 0.72 | 0.21 | 0.42 | 1253 |

TABLE 3-continued

MATERIAL AND ENERGY BALANCE ACCORDING TO FIG. 4 TO PRODUCE 25% OXYGEN AIR

| y, % $O_2$ | R ($O_2$ Recovery) in Oxy-rich | A/P | F/P | E/P | KWH lb mole of P | lbs Adsorbent per bed/P |
|---|---|---|---|---|---|---|
| 0.50 | 0.48 | 0.86 | 0.68 | 0.14 | 0.43 | 1169 |

Table 3 shows the material and energy balance according to FIGS. 3 and 4 to produce a product of 25% $O_2$ concentration utilizing an oxygen enriched effluent of 30, 40, and 50% $O_2$ to which ambient air is added, as compared to a directly produced product of 25% $O_2$. The table shows the amount of oxygen (R) recovered from the adsorption process at the several levels of oxygen concentration, the proportions of added ambient air (A/P) and oxygen-enriched effluent (E/P) used to make 25% $O_2$ product; the quantity of feed air (F/P) employed to produce P, the total energy required in KWH per pound mole of product, and the amount in pounds of nitrogen retaining adsorbent used in production of the product of 25% $O_2$ concentration.

As seen from Table 3 there is a 25% reduction in overall energy requirement and 50% reduction in adsorbent inventory, if the enrichment process is employed to produce 40% oxygen gas and diluted back to 25% $O_2$ concentration as compared to direct production of 25% $O_2$ enriched gas.

While Table 3 relates particularly to operation of the process of the invention under conditions to obtain an oxygen enriched effluent of 30 to 50% oxygen concentration and diluting the effluent with ambient air to obtain a final gas product of 25% $O_2$ concentration, it will be understood that other desired products in the range of about 25 to 35% $O_2$ can similarly be prepared by proportioning the quantity of ambient air added to an oxygen-enriched gas stream produced in accordance with the invention.

What is claimed is:

1. The method of obtaining from ambient air a product stream having a moderately enriched oxygen concentration, which comprises the steps of:
   (1) introducing the feed air into a closed bed of adsorbent selective in retention of nitrogen to increase the pressure in that bed from atmospheric to higher level first pressure of at least 1.5 atmospheres and not in excess of about 10 atmospheres,
   (2) then immediately upon reaching said first pressure stopping introduction of feed air at the first pressure and reducing the bed pressure from said first pressure to an intermediate level second pressure which is above atmospheric but less than 0.75 times the first pressure by withdrawing from the bed and recovering as product a gas which is enriched in oxygen in the range of 23 to 50% by volume, said withdrawal being carried out in a flow direction concurrent with that of initial introduction of feed air into the bed,
   (3) and immediately upon reaching said second pressure venting the bed to restore atmospheric pressure therein, said venting being carried out in a flow direction counter to that of said withdrawal of oxygen enriched product gas.

2. The method of claim 1 wherein the initial introduction of feed air is continued until said bed reaches a first pressure level in the range from about 1.5 to about 4 atmospheres.

3. The method of claim 2 wherein the enriched product gas has an oxygen content in the range of 23 to 26% by volume.

4. The method of claim 1 wherein the second pressure is less than about 0.70 times the first pressure.

5. The method of claim 1 wherein following said venting of the bed to atmospheric pressure, the bed is purged in a flow direction countercurrent to that of initial introduction of feed air into the bed with part of the oxygen enriched product gas, the cycle steps (1) through (3) and the purging are repeated and the enriched product gas has an oxygen content in the range of 23 to 50% by volume.

6. The method of either claim 1 or 5 wherein the defined operation is carried out in a system comprising at least two adsorbent bed-containing columns operated stepwise in parallel, such that ambient air to the system and withdrawal of oxygen enriched product gas from the system is continuous.

7. The method of claim 5 wherein the defined operation is carried out in a system comprising four adsorbent bed-containing columns operated stepwise in parallel, such that feed of ambient air to the system and withdrawal of oxygen enriched product gas from the system is continuous.

8. The method of claim 7 wherein the defined operation is carried out in a cycle of 40–960 seconds, one-fourth of which time each respectively is devoted in sequence to the steps of (1) adsorption of nitrogen from the feed air, (2) depressuring the bed to the intermediate second pressure level by withdrawal of oxygen enriched product gas therefrom, (3) venting the bed to atmospheric pressure and (4) purging the bed countercurrent to the direction of air feed introduction with collected oxygen enriched product gas.

9. The method of claim 1 wherein the defined operation is carried out in a system comprising three adsorbent bed-containing columns operated stepwise in parallel, such that feed of ambient air to the system and withdrawal of oxygen-enriched product gas from the system is continuous.

10. The method of claim 9 wherein the defined operation is carried out in a cycle of 30–720 seconds, one-third of which time each respectively is devoted in sequence to the steps of (1) adsorption of nitrogen from the feed air, (2) depressuring the bed to the intermediate second pressure level by withdrawal of oxygen enriched product gas therefrom in a direction concurrent to the direction of air feed introduction and (3) venting the bed to atmospheric pressure countercurrent to the direction of air feed introduction for start of the next cycle.

11. The method of producing from ambient air an oxygen enriched product gas having an oxygen concentration in the range of 23 to 35% by volume $O_2$, which comprises:
   (a) passing ambient air at super atmospheric pressure into a bed of adsorbent selective in retention of nitrogen to increase the pressure in that bed from atmospheric to a higher first pressure level of at least 1.5 atmospheres and not in excess of about ten atmospheres,
   (b) then immediately upon reaching said first pressure stopping introduction of said ambient feed air at the first pressure and reducing the bed pressure from said first pressure to an intermediate second pressure level above atmospheric but less than 0.75 times the first pressure by withdrawing from the bed and collecting an oxygen enriched product gas, said withdrawal being carried out in a flow direction concurrent with that of initial introduction of feed air into the bed, (c) immediately upon reaching said second pressure venting the bed to restore atmospheric pressure therein, venting being carried out in a flow direction counter to that of said withdrawal of oxygen enriched product gas, (d) and then purging the bed with part of the oxygen enriched product gas countercurrent to the direction of air feed introduction, prior to repeating the sequence starting with step (a);

thereby obtaining an enriched product gas having an oxygen concentration in the range of above 25% and up to about 50% by volume $O_2$, and diluting said enriched product gas to the desired oxygen concentration in the range of by volume 23% to 35% $O_2$ by admixture of ambient air therewith.

* * * * *